Jan. 11, 1966  L. FULLHART, JR., ET AL  3,228,806
STABILIZATION OF CHLOROHYDROCARBONS
IN PHOSPHORIC ACID COATING BATHS
Filed Aug. 4, 1961  2 Sheets-Sheet 1
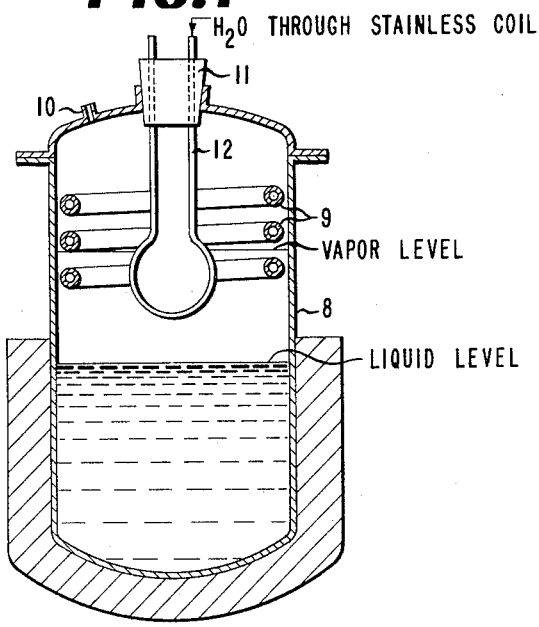
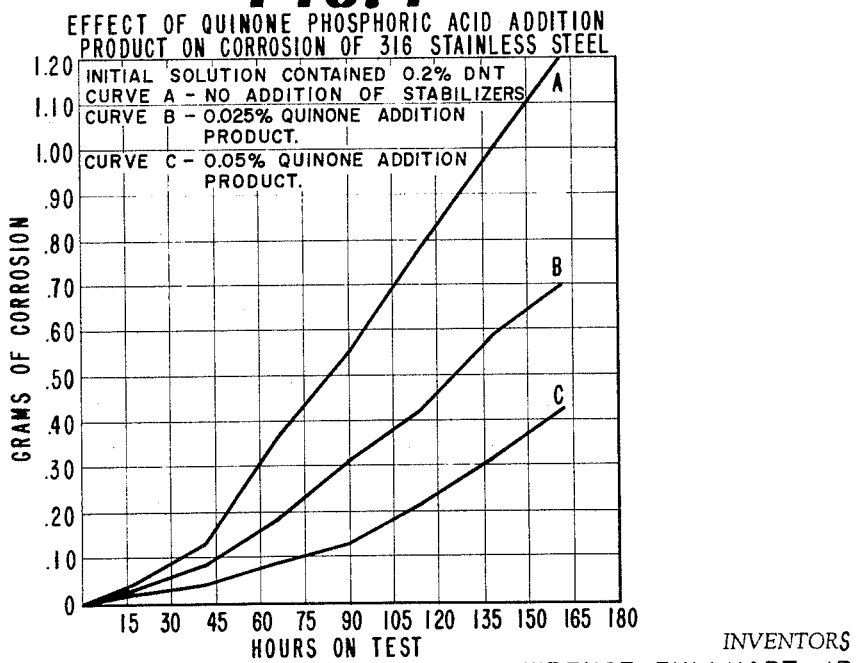
INVENTORS
LAWRENCE FULLHART, JR
DONALD A. SWALHEIM
BY *[signature]*
ATTORNEY EFFECT OF p-QUINONE ON THE CORROSION OF 316 STAINLESS STEEL COILS EFFECT OF WORK LOAD ON AMOUNT OF p-QUINONE TO PROTECT 316 STAINLESS STEEL FROM CORROSION

United States Patent Office 3,228,806
Patented Jan. 11, 1966

3,228,806
STABILIZATION OF CHLOROHYDROCARBONS IN PHOSPHORIC ACID COATING BATHS
Lawrence Fullhart, Jr., Newark, and Donald Arthur Swalheim, Hockessin, Del., assignors to E. I. du Pont de Nemours and Company, Wilmington, Del., a corporation of Delaware
Filed Aug. 4, 1961, Ser. No. 129,351
10 Claims. (Cl. 148—6.15)

This invention relates to the stabilization of chlorohydrocarbons and, more particularly, it relates to the stabilization of halohydrocarbons under highly acid conditions.

Throughout the specification and claims, the term "halohydrocarbon" refers to halo-substituted hydrocarbon solvents containing one to three carbon atoms including, for example, trichlorethylene, perchlorethylene, methylene chloride, methyl chloroform, carbon tetrachloride and, particularly, trichlorethylene and perchlorethylene, trifluorotrichloroethane, difluorotetrachloroethane, dibromotetrafluoroethane, dichlorotetrafluoroethane, and trichlorofluoromethane.

Chlorohydrocarbons are extensively used in metal cleaning and degreasing operations. Many stabilizers have been used to stabilize halohydrocarbons, particularly chlorohydrocarbons, against deterioration during metal cleaning and degreasing operations.

These stabilizers function to prevent halohydrocarbon deterioration in the presence of heat, light and/or oxygen under alkaline or neutral conditions. More recently, attempts have been made to phosphatize metal surfaces in a halohydrocarbon-phosphoric acid solution. Such solutions are prepared with the use of a solubilizing agent for the solubilization of the phosphoric acid in the halohydrocarbon, for example, trichlorethylene, As examples of solubilizing agents may be named amyl and butyl alcohols, alkyl phosphates and the like. The resulting highly acid trichlorethylene is unstable even in the presence of previously known stabilizing agents. Such phosphatizing trichlorethylene solution is particularly unstable when used for the phosphatizing of metals. For example, when phosphatizing iron surfaces the phosphoric acid forms ferrous phosphate and releases nascent hydrogen, also referred to as "free-radical hydrogen." The nascent hydrogen reacts with the halohydrocarbon, for example, trichlorethylene, to decompose the same, releasing HCl. This HCl is much more deteriorating and corrosive to metal surfaces, particularly equipment surfaces, than is phosphoric acid.

Still more recently, certain hydrogen accepting agents have been suggested for the stabilization of halohydrocarbons under highly acid and metal phosphatizing conditions. Such hydrogen accepting agents comprise nitroaromatic compounds as disclosed in our copending application, Serial No. 72,590, filed November 30, 1960, now abandoned, and nitrosoaromatic and azoaromatic compounds as disclosed in our copending application, Serial No. 82,159, filed January 12, 1961, now U.S. Patent 3,051,595. Although such hydrogen accepting agents stabilize a halohydrocarbon against the formation of large amounts of HCl by accepting nascent hydrogen released as a result of the acid phosphatization of metals, these compounds could not accept such HCl as may have been formed therein. Hydrogen chloride acceptors presently used in a number of trichlorethylene compositions are not useful in phosphatizing processes by reason of the presence of considerable amounts of phosphoric acid. In fact, the acceptance of HCl in the presence of much larger amounts of phosphoric acid presented a major obstacle to the successful phosphatizing of metals with a phosphoric acid-halohydrocarbon solution.

It is an object of this invention to stabilize a halohydrocarbon in the presence of phosphoric acid.

It is another object of the invention to substantially eliminate a corrosive acid condition in a phosphoric acid-halohydrocarbon solution.

It is a further object to eliminate HCl formed in a solution of phosphoric acid in a halohydrocarbon under metal phosphatizing conditions.

It is a still further object of this invention to prevent substantial formation of HCl under metal phosphatizing conditions in a phosphoric acid-halohydrocarbon solution and to eliminate any HCl that may be formed therein.

The objects of this invention are accomplished by the addition of a stabilizing amount of a quinone to a phosphoric acid-halohydrocarbon solution. The quinones function both to accept nascent hydrogen as well as HCl formed in halohydrocarbon solution. Therefore, quinones may be used alone in a halohydrocarbon-phosphoric acid solution to prevent corrosion of equipment. The quinones appear to form hydroquinones by reacting with the nascent hydrogen, and it forms halohydroquinones, for example, a chlorohydroquinone, by reaction with HCl. The property of a quinone whereby it is capable of accepting relatively small quantities of HCl in the presence of much larger quantities of phosphoric acid is apparently of a highly unique nature. The preferential reaction of quinones to combine with HCl in the presence of phosphoric acid makes them outstanding compounds as stabilizers in acid solutions such as trichlorethylene phosphatizing solutions. Since chlorohydrocarbons are by far the most important halohydrocarbons at the present time, reference will hereinafter be made specifically to chlorohydrocarbons, it being understood, however, that the conditions described with reference to the chlorohydrocarbons also prevail in the case of fluoro- and bromohydrocarbons as above named.

Of course, it may be expected that the type of decomposition described above with its attendant corrosion problems will be particularly severe where the system employing a chlorohydrocarbon solvent is of design an acidic medium. This has been found to be the case in actual practice and, for this reason, quinones of the present invention have particular utility in an anhydrous phosphatizing system employed in metal finishing operation as a desired means of applying phosphate coatings to metal surfaces to improve paint adhesion and reduce corrosion. In the execution of such a system, which is highly acidic, metallic surfaces are contacted with a composition consisting of a chlorohydrocarbon solvent as a primary component with a phosphatizing amount of phosphoric acid and an agent which solubilizes the phosphoric acid in the chlorohydrocarbon solvent. Broadly, a phosphatizing amount of commercial orthophosphoric acid may be considered to be an amount between approximately 0.05 and 7.5% by weight based on the total weight of the bath. Representative of agents which may be used to solubilize phosphoric acid in the bath are lower molecular weight aliphatic alcohols containing from 3 to 8 carbon atoms and alkyl acid phosphate compounds. Of these, the lower molecular weight alcohols, particularly butyl and amyl alcohol, are preferred and based on the above-stated range of phosphoric acid, an amount of the alcohol in the range of from 1 to 10% by weight based on the total weight of the bath is preferred.

It has been found that anhydrous phosphatizing baths of this type may be conveniently employed as part of an integrated unit which also includes solvent degreasing and/or painting operations separated from the phosphatizing bath by suitable partitions but under a common vapor zone of the chlorohydrocarbon solvent. Due to the volatility of the hydrogen chloride and corrosive chlorides formed through the decomposition of the chlorohydrocarbon solvent by virtue of the acid medium in the phosphatizing bath, corrosion in the metal container of such an integrated unit is not confined to the immediate vicinity of the phosphatizing bath but rather extends across the entire unit, particularly at the condensate region of the unit. Obviously, in order for the operation of such an integrated system to be commercially successful, decomposition of the chlorohydrocarbon solvent, and the corrosion problems this decomposition presents, must be prevented.

The amount of the quinone stabilizing agents required to provide effective stabilization of chlorohydrocarbons is quite small and will vary to some extent with the individual quinone compound. As noted elsewhere, the amount of stabilizer necessary will vary with the amount of work being processed and, to some degree, on the extent of other stabilizers present. In general, an amount between .001 and 1% by weight based on the amount of chlorohydrocarbon will be preferred, although some stabilization occurs even when lower concentrations are employed. There is no upper limit in concentration, but amounts over 5% by weight offer no particular advantage and are not justified economically.

Corrosion of equipment in metal phosphatizing operations with phosphoric acid-chlorohydrocarbon solutions has been almost entirely eliminated and exceptionally desirable results from an economic point of view have been obtained by combining the above-mentioned quinones with nitro, nitroso or azoaromatic compounds. These nitrogen-containing aromatic compounds function to accept hydrogen released as a result of the metal phosphatizing and the slight amount of HCl formed under such conditions appears to be accepted by the quinones.

In combining the quinones with the aforesaid nitrogen-containing aromatic compounds in the phosphoric acid-chlorohydrocarbon solution, the quinone may be present in an amount between 0.001% and 5% and the nitro, nitroso or azoaromatic may be present in an amount between 0.01% and 5%, based on the weight of the phosphoric acid-chlorohydrocarbon solution.

The phosphatizing solution of chlorohydrocarbon of this invention may, if desired, contain certain other known stabilizers.

In the following description, reference will be made to the accompanying illustrations, in which, FIGURE 1 is a diagrammatic side elevational view of a glass kettle equipped to measure corrosion of a metal coil;

FIGURE 4 is a plotted diagram showing the effect of the addition product of p-quinone and phosphoric acid on the corrosion of No. 316 stainless steel.

Figure 2:
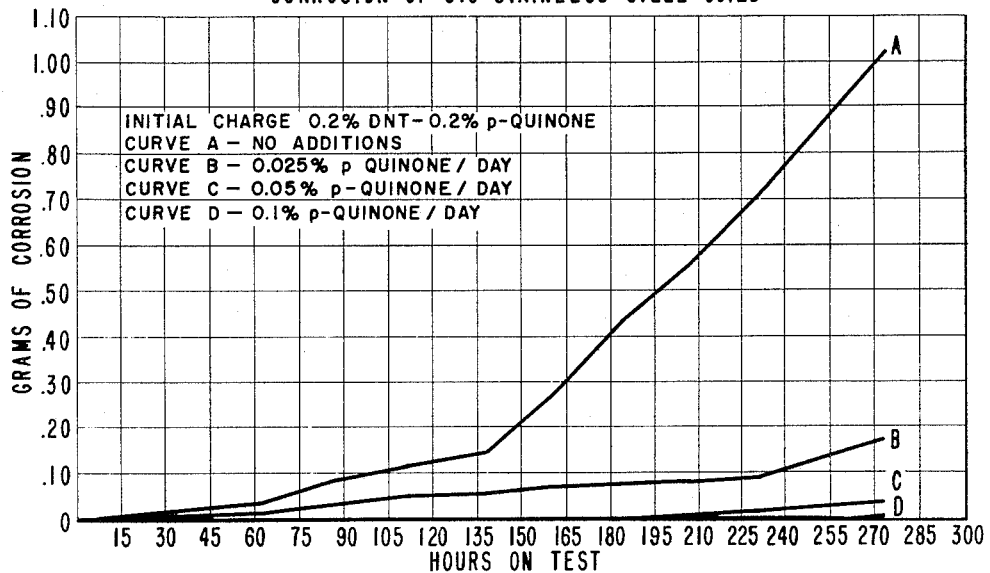
FIGURE 2 is a plotted diagram showing the effect of p-quinone on the corrosion of No. 316 stainless steel coils.

The following detailed examples are given to illustrate the principles of this invention.

ZINC DUST TEST

The following laboratory test, hereinafter referred to as the "Zinc Dust Test" has been devised to simulate the stabilizing action of various stabilizing agents in an anhydrous chlorohydrocarbon phosphatizing bath operating under actual phosphatizing conditions on metal surfaces. This test will be referred to in the examples that follow.

The basic bath composition for this test consists of 94.5% by weight trichlorethylene, 0.5% by weight commercial 85% orthophosphoric acid and 5% by weight of amyl alcohol as an agent to solubilize said phosphoric acid in the trichlorethylene. The trichlorethylene used in the test was a so-called technical grade containing 0.01% by weight of pentaphen (para tertiary amyl phenol) and 0.3% by weight of diisobutylene as an oxidation stabilizing system.

The test is carried out by adding 0.1 g. of high purity zinc dust to 500 ml. of the above bath maintained at the reflux temperature. After ten minutes, the bath is filtered for the removal of insolubles and 100 ml. thereof mixed thoroughly with an equal volume of water in a separatory funnel. The water layer is then decanted from the liquid mixture and analyzed for water-soluble chlorides. The measured result of the test is the amount of chlorides present in parts per million and is considered to vary proportionately with the degree of trichlorethylene decomposition and corrosivity potential resulting therefrom.

The following tabulated results show the amount of chlorides, in parts per million, found by carrying out the zinc dust test containing given amounts of quinone stabilizers of the invention in comparison with a control containing no stabilizers except the pentaphen and diisobutylene contained in the trichlorethylene.

*Table I.—Zinc dust test for phosphatizing solution stabilizers—quinones*

| Ex. No. | Stabilizer | Concentration weight, percent | Chlorides, p.p.m. |
|---|---|---|---|
| 1 | p-Quinone | 0.05 | 13 |
| 2 | do | 0.1 | 3 |
| 3 | do | 0.2 | 1 |
| 4 | 1,2-dihydroxy-anthraquinone | 0.05 | 5 |
| 5 | do | 0.1 | 1 |
| 6 | do | 0.4 | 1 |
| 7 | 1,5-dihydroxy-anthraquinone | 0.2 | 1 |
| 8 | 1,2,5,8-tetrahydroxy-anthraquinone | 0.2 | 1 |
| 9 | Di-tert-butyl-p-quinone | 0.1 | 12 |
| 10 | do | 0.2 | 10 |
| 11 | do | 0.4 | 7 |
| 12 | Tetrachloro-p-quinone | 0.5 | 20 |
| 13 | p-Quinone phosphate addition product. | 0.2 | 4 |
| 14 | 1-amino-2-bromo-4-p-toluene anthraquinone. | 0.4 | 20 |
| 15 | 2,3-dicarbethoxy-p-benzoquinone | 0.28 | 15 |
| 16 | 2,5-dihydroxy-p-benzoquinone | 0.5 | 2 |
| 17 | Quinhydrone | 0.5 | 1 |
| 18 | 2,6-dichloro-p-quinone | 0.2 | 20 |
| 19 | 2,5-dichloro-3,6-dimethoxy-p-quinone. | 0.2 | 40 |
| 20 | do | 0.4 | 20 |
| 21 | 2,5-dichloro-p-quinone | 0.2 | 30 |
| 22 | 1,2-naphthoquinone | 0.3 | 4 |
| 23 | 2-methyl-1,4-naphthoquinone | 0.3 | 15 |
| 24 | 1,2-naphthoquinone-4-sulfonic acid sodium salt. | 0.3 | 25 |
| 25 | 2-chloroanthraquinone | 0.3 | 15 |
| 26 | 2-methyl-1-nitroanthraquinone | 0.3 | 1 |
| 27 | 1-hydroxyanthraquinone | 0.3 | 15 |
| 28 | Trichlorethylene (control) | | 50+ |

In the table, Example No. 13 constitutes the addition product isolated by the addition of p-quinone to trichlorethylene containing 0.5% by weight of phosphoric acid.

CORROSION TEST

*Effect of quinones on the corrosion of stainless steel*

While the reduction of chloride ion concentration is a good indication of the prevention of trichlorethylene breakdown, it is also desirable to demonstrate that under practical conditions the phosphatizing solutions of this invention are substantially non-corrosive. For this purpose, a demonstration was set up according to the following procedure. A glass kettle was equipped as shown in FIGURE 1 of the drawings. The kettle 8 has a capacity of 3 liters. It is equipped with glass cooling coils 9, and air vent 10, a stopper 11, and a stainless steel coil 12 projecting therethrough into the area of vapor level of the trichlorethylene phosphatizing composition. Means, such as a heating mantle, are provided to maintain the kettle at the reflux temperature of the solution.

The vessel is charged with 1500 cc. of technical grade trichlorethylene containing .3% diisobutylene and 0.01% pentaphen as oxidative stabilizers and 5.0% n-amyl alcohol, 0.2% dinitrotoluene (DNT) and 0.5% commercial 85% orthophosphoric acid.

The stainless steel coil 12 is composed of No. 316 stainless steel and is carefully weighed. Cooling water is run through the glass condenser coil 9 as well as condenser coil 12. When the solution is brought to reflux, the coil 12 functions in the same manner as a cooling coil in a commercial unit. The coil 12 is removed at intervals as indicated and weighed. The loss in weight is a measure of corrosion.

In order to make this test typical of actual practice, iron powder was added each day to simulate work load. As stated previously, the phosphoric acid reacts with the metal surface to form iron phopshate with the liberation of hydrogen. Thus, phosphoric acid is consumed in relation to the square feet of metal surface introduced into the bath. Calculations from commercial units have shown that 17 sq. ft. of work require about 2 cc. of phosphoric acid. In the laboratory it was found that 1 g. of iron powder (high purity) required about 2 cc. of phosphoric acid. Thus, iron powder has been used in the laboratory to simulate commercial runs. In the present study 1.5 g. of iron powder was added each day to correspond to a work load of 64 sq. ft. per gal. of bath per day. This level of work load is commensurate with that found in the industry.

In Table II, Example 29, below, it can be seen that the addition of p-quinone greatly reduced corrosion; in fact, it appears possible to prevent corrosion entirely. These results are also shown plotted in FIGURE 2 of the drawings in which curve A shows corrosion without addition of p-quinone to bath. Curves B, C and D, respectively, show corrosion results by addition of .025, .05 and .1 percent p-quinone per day.

EXAMPLE 29

Table II.—Effect of p-quinone on corrosion rate of 316 stainless steel over 11 days

| Percent p-quinone per day | Workload, sq. ft./gal./day | Corrosion, grams |
|---|---|---|
| 0 | 64 | 1.0217 |
| 0.025 | 64 | 0.1764 |
| 0.05 | 64 | 0.0383 |
| 0.1 | 64 | 0.0019 |

Similar tests have been made with cold rolled and drawn steel and "Hastelloy" alloys with similar results.

Since the reaction of phosphatizing results in the production of hydrogen, and since p-quinone is easily reduced, p-quinone will be used up somewhat in relation to the work load imposed on the bath. This fact is illustrated in the following example which was performed in the same manner as Example 29.

EXAMPLE 30

In this test the rate of p-quinone addition was held constant at 0.5% and the work load varied from 170 sq. ft./gal./day to 21.25 sq. ft./gal./day. Thus, 0.05% p-quinone will prevent corrosion at a work rate of 42.5 sq. ft./gal./day while at higher work loads, increasing amounts of p-quinone are needed.

Table III.—Effect of work load on stabilizing requirements of p-quinone*

| Rate of p-quinone addition in percent/day | Work load, sq. ft./gal./day | Corrosion, grams |
|---|---|---|
| .05 | 170 | .4535 |
| .05 | 85 | .2650 |
| .05 | 42.5 | .0028 |
| .05 | 21.25 | .0014 |

*15 day test.

Figure 3:
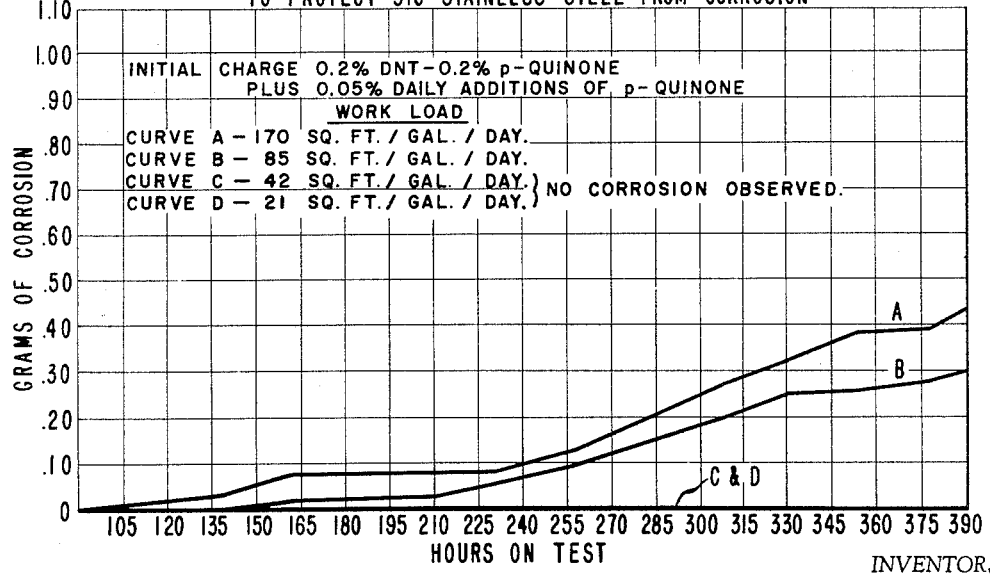
FIGURE 3 is a plotted diagram showing the effect of work load on a given amount of p-quinone to protect the surface of No. 316 stainless steel from corrosion.

These results are shown plotted in FIGURE 3 of the drawings.

In an attempt to analyze the phosphatizing solution for p-quinone it was found that after the solution had refluxed for several minutes, no quinone was present when determined by gas chromatography. The test was then repeated and analyzed at intervals to determine the rate of disappearance of the quinone. A solution composed of 93.5% trichlorethylene, 5% amyl alcohol, 0.5% phosphoric acid and 1% p-quinone was refluxed for three hours. The results are given in Table IV.

EXAMPLE 31

Table IV.—Stability of p-quinone in trichloroethylene, amyl alcohol and phosphoric acid by gas chromatography Time, hours:      Percent of starting p-quinone
```
0 ------------------------------------------ 100
1 ------------------------------------------  61
2 ------------------------------------------  11
3 ------------------------------------------   0
```

However, it was obvious from the tests that had been made that the solution still retained its stabilizing properties which, as stated above, are dependent upon the acceptance of HCl. This was verified by repeating the zinc dust test using a solution which had been refluxed for 2 hours and, thus, would have less than 12% of the quinone present as such. The results are shown in Table V.

EXAMPLE 32

Table V.—Stabilizing effect of p-quinone in zinc dust test after 2 hrs. reflux in phosphating solution

| Sample | Concentration, percent | Chlorides, p.p.m. |
|---|---|---|
| 1. Control | | 25 |
| 2. p-Quinone | 0.05 | 20 |
| 3. p-Quinone | 0.1 | 12 |
| 4. p-Quinone | 0.2 | 1 |

The nature of the quinone compound present in the phosphatizing solution was investigated. It was found that if a non-phosphatizing solution was prepared with the other materials present as in Example 21, but without the phosphate acid, on refluxing 2 hours, no change in the p-quinone content took place as measured by gas chromatography.

EXAMPLE 33

Table VI.—Stability of p-quinone in trichlorethylene and amyl alcohol by gas chromatography Time, hours:      Percent of starting p-quinone
```
0 ------------------------------------------ 100
1 ------------------------------------------ 100
2 ------------------------------------------ 100
```

Thus, the quinone was reacting with the phosphoric acid to form some loose complex, since the quinone was still free to exert a stabilizing effect and the phosphoric acid was also titratable with a basic solution. As will appear below, by reacting phosphoric acid with p-quinone in chloroform a compound containing quinone and phosphoric acid has now been isolated. This compound, on reaction with a halogen acid, e.g., hydrogen chloride will form chlorohydroquinone and dichlorohydroquinone according to the following reaction sequence:

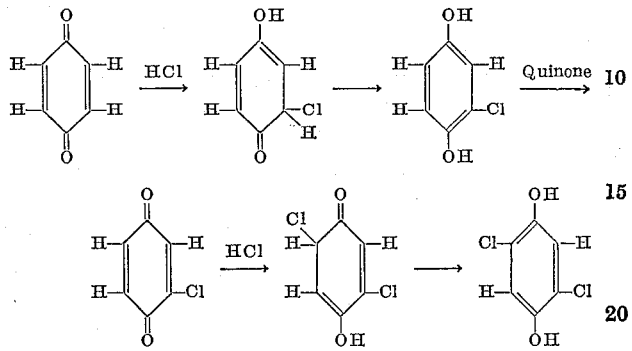

By reacting phosphoric acid with p-quinone in chloroform a compound containing quinone and phosphoric acid was isolated as follows:

To a solution of 19 g. (0.176 mole) of p-quinone in 250 ml. of chloroform was added 11 cc. (.176 mole) of 85% phosphoric acid. The reaction mixture was refluxed for three hours during which time a dark precipitate formed. The chloroform was distilled off and the precipitate washed with water. The material had an indistinct melting point of approximately 199° C.

The p-quinone phosphoric acid addition product as isolated was subjected to elemental analysis. The results listed below indicate the compound is probably made up of 1 molecule of p-quinone, 1 molecule of hydroquinone and 1 molecule of phosphoric acid.

| Analysis | Carbon | | Hydrogen | | Phosphorus | |
|---|---|---|---|---|---|---|
| | Calc'd | Found | Calc'd | Found | Calc'd | Found |
| $C_{12}H_{13}O_8P$ | 45.60 | 46.60 | 4.12 | 3.77 | 9.98 | 8.96 |

The p-quinone phosphoric acid addition product was shown to have a stabilizing effect on the phosphatizing solution by reducing chloride ion formation in the zinc dust test. Furthermore, in the corrosion test using 316 stainless steel coils as described above, graded amounts were shown to reduce corrosion significantly (Table VII below and FIGURE 4 of the drawings).

EXAMPLE 34

*Table VII.—Effect of p-quinone phosphoric acid addition product on the corrosion of 316 stainless steel\**

| Percent p-quinone addition product per day | Work load, sq. ft./gal./day | Corrosion, grams |
|---|---|---|
| 0 | 64 | 1.0061 |
| .025 | 64 | .5854 |
| .05 | 64 | .3152 |

*Test period 8 days.

*HCl acceptance of quinone in presence of phosphoric acid.*—A phosphatizing solution was prepared containing 0.4% p-quinone, .5% phosphoric acid, 5% amyl alcohol, 0.01% pentaphen and 0.3% diisobutylene and the remainder trichlorethylene. To this solution was added two concentrations of hydrochloric acid. These solutions were titrated before and after 1 hour reflux. The data in Table VIII shows by titration, the pick-up of hydrochloric acid in the presence of phosphoric acid. Similar data in Table IX show pick-up of HCl in presence of quinone-phosphoric acid addition product. In the concentration used, the p-quinone, or its phosphoric acid addition product, reacted essentially quantitatively with the hydrochloric acid.

EXAMPLE 35

*Table VIII.—Hydrochloric acid acceptance of p-quinone in typical phosphatizing solution*

| Solution | Titer before reflux, cc. 0.1 N NaOH | Titer after reflux, cc. 1.0 N NaOH |
|---|---|---|
| 1. Control | 22.2 | 22.0 |
| 2. Control plus .02 cc. conc. hydrochloric acid | 24.2 | 22.6 |
| 3. Control plus .05 cc. conc. hydrochloric acid | 27.6 | 21.5 |

EXAMPLE 36

*Table IX.—Hydrochloric acid acceptance of phosphoric acid addition product of p-quinone*

| Sample | Titer before reflux, cc. 0.1 N NaOH | Titer after reflux, cc. 1.0 N NaOH |
|---|---|---|
| Solution of tri-tech, amyl alcohol, p-quinone phosphate addition product and .2 cc. hydrochloric acid | 37.3 | 16.2 |

In Example 36, the difference in titer is 21.1 cc. against a calculated difference of 24 cc. indicating 88% acceptance of HCl.

*Effect of quinone on effective life of phosphatizing solution.*—One of the major factors affecting the economical operation of a phosphatizing unit is the length of time a single solution will effectively phosphatize. By effective phosphatizing is meant the formation of a coating weighing at least about 160 to 170 mg. per sq. ft. of surface. The bath life during which it will effectively phosphatize is influenced by the amount of foreign material carried into the bath, by the parts being processed, decomposition of the stabilizers and solvent, and by vessel corrosion products. Thus, bath life can be extended by reducing any of these conditions. It has been found in accordance with this invention that the presence of a quinone in the phosphatizing bath dramatically increases the bath life for effective phosphatizing. The presence of the quinone largely prevents the entrance of metal salts that will inhibit phosphatization into the solution, and hydrochloric acid formation is reduced to a minimum since there is no breakdown of the chlorinated solvent. For example, a standard phosphatizing solution consisting of trichlorethylene, 0.01% pentaphen, 0.3% diisobutylene, 0.2% dinitrotoluene, 5% amyl alcohol and 0.5% phosphoric acid will produce a phosphate coating of 200 mg./sq. ft. while processing 200–300 sq. ft. of iron sheeting per gallon of solution, thereafter coating weights drop below 100 mg./sq. ft., which is not commercially acceptable. In a similar composition which was maintained with the addition of 0.1% p-quinone, a coating weight of 200 mg./sq. ft. was maintained while processing 1000–1500 sq. ft. of similar iron sheeting per gallon of solution.

The effect of quinones in stabilizing phosphatizing solutions is not limited to trichlorethylene as used in the above examples but are equally effective in stabilizing other halogenated solvents used in this manner. This is illustrated in Table X below, where numerous other halohydrocarbon solvents were tested by the Zinc Dust Test. In all cases, the quinones of this invention exhibit a protective influence as shown below.

*Table X.—Stabilizing effect of p-quinone on various halogenated solvents in the zinc dust test*

| Ex. No. | Test Solution | Chlorides, p.p.m. |
|---|---|---|
| 37 | Unstabilized trichlorethylene | 50 |
| 38 | Unstabilized tri plus .2% p-quinone | 1 |
| 39 | Trichlorotrifluoroethane | 50 |
| 40 | Trichlorotrifluoroethane plus .2% p-quinone | 1 |
| 41 | Tetrachloroethylene | 5 |
| 42 | Tetrachloroethylene plus .2% p-quinone | 1 |
| 43 | Carbon tetrachloride | 50 |
| 44 | Carbon tetrachloride plus .5% p-quinone | 3 |
| 45 | Trichlorethylene plus .01% pentaphen plus .3% diisobutylene. | 50 |
| 46 | Trichlorethylene plus .01% pentaphen plus .3% diisobutylene plus .2% p-quinone. | 1 |
| 47 | Trichlorethylene plus .01% pentaphen plus .3% diisobutylene plus 0.3% 1,5-dihydroanthraquinone. | 35 |
| 48 | Trichlorethylene plus .01% pentaphen plus .3% diisobutylene plus 0.3% 1-hydroxyanthraquinone. | 8 |
| 49 | Trichlorethylene plus .01% pentaphen blus .3% diisobutylene plus 0.3% 1,2-naphthoquinone. | 5 |
| 50 | Trichlorethylene plus .01% pentaphen plus .3% diisobutylene plus 0.3% 1,2-dihydroxyanthraquinone. | 30 |
| 51 | Carbon tetrachloride plus 0.3% 1,2-naphthoquinone. | 1 |

Throughout the specification and claims, any reference to parts, proportions and percentages refers to parts, proportions and percentages by weight unless otherwise specified.

Since it is obvious that many changes and modifications can be made in the above-described details without departing from the nature and spirit of the invention, it is to be understood that the invention is not to be limited to said details except as set forth in the appended claims.

We claim:

1. An anhydrous metal phosphatizing composition consisting essentially of a halohydrocarbon solvent, phosphoric acid, a solubilizing agent for said phosphoric acid in said halohydrocarbon solvent and, as an agent to prevent the presence of objectionable corrosive amounts of a hydrogen halide, 0.001% to 5% of a quinone.

2. An anhydrous metal phosphatizing composition consisting essentially of a chlorohydrocarbon solvent, phosphoric acid, a solubilizing agent for said phosphoric acid in said chlorohydrocarbon solvent and, as an agent to prevent the presence of objectionable corrosive amounts of a hydrogen chloride, 0.001% to 5% of a quinone.

3. An anhydrous metal phosphatizing composition consisting essentially of trichlorethylene, phosphoric acid, a solubilizing agent for said phosphoric acid in said trichlorethylene and, as an agent to prevent the presence of objectionable corrosive amounts of hydrogen chloride, 0.001% to 5% of a quinone.

4. An anhydrous metal phosphatizing composition consisting essentially of a halohydrocarbon solvent, phosphoric acid, a solubilizing agent for said phosphoric acid in said halohydrocarbon solvent, a nitrogen-containing compound taken from the group consisting of nitro-aromatic, nitroso-aromatic and azo-aromatic compounds and, as an agent to prevent the presence of objectionable corrosive amounts of a hydrogen halide, 0.001% to 5% of a quinone.

5. An anhydrous metal phosphatizing composition consisting essentially of a chlorohydrocarbon solvent, phosphoric acid, a solubilizing agent for said phosphoric acid in said chlorohydrocarbon solvent, a nitrogen-containing compound taken from the group consisting of nitro-aromatic, nitroso-aromatic and azo-aromatic compounds and, as an agent to prevent the presence of objectionable corrosive amounts of a hydrogen chloride, 0.001% to 5% of a quinone.

6. An anhydrous metal phosphatizing composition consisting essentially of a halohydrocarbon solvent, phosphoric acid, a solubilizing agent for said phosphoric acid in said halohydrocarbon solvent and, as an agent to prevent the presence of objectionable corrosive amounts of a hydrogen halide, 0.001% to 5% of p-quinone.

7. An anhydrous metal phosphatizing composition consisting essentially of a halohydrocarbon solvent, phosphoric acid, a solubilizing agent for said phosphoric acid in said halohydrocarbon solvent, and as an agent to prevent the presence of objectionable corrosive amounts of a hydrogen halide, 0.001 to 5% of the p-quinone-phosphoric acid addition product obtainable by reacting p-quinone with phosphoric acid.

8. An anhydrous metal phosphatizing composition consisting essentially of a halohydrocarbon solvent, phosphoric acid, a solubilizing agent for said phosphoric acid in said halohydrocarbon solvent and, as an agent to prevent the presence of objectionable corrosive amounts of a hydrogen halide, 0.001% to 5% of quinhydrone.

9. An anhydrous metal phosphatizing composition consisting essentially of a halohydrocarbon solvent, phosphoric acid, a solubilizing agent for said phosphoric acid in said halohydrocarbon solvent and, as an agent to prevent the presence of objectionable corrosive amounts of a hydrogen halide, 0.001% to 5% of 1,2-dihydroxyanthraquinone.

10. An anhydrous metal phosphatizing composition consisting essentially of a halohydrocarbon solvent, phosphoric acid, a solubilizing agent for said phosphoric acid in said halohydrocarbon solvent and, as an agent to prevent the presence of objectionable corrosive amounts of a hydrogen halide, 0.001% to 5% of 1,5-dihydroxyanthraquinone.

References Cited by the Examiner

UNITED STATES PATENTS

| | | | |
|---|---|---|---|
| 2,008,680 | 7/1935 | Carlisle et al. | 260—652.5 |
| 2,301,209 | 11/1942 | Gibson | 148—6.17 |
| 2,408,155 | 9/1946 | Thornbury | 148—6.15 |
| 2,757,141 | 7/1956 | Ross et al. | 260—652.5 X |
| 2,789,070 | 4/1957 | Copelin | 148—6.15 |
| 2,935,518 | 5/1960 | Reetz | 260—396 |
| 2,969,378 | 1/1961 | Gleim | 260—396 |
| 3,051,595 | 8/1962 | Fullhart et al. | 148—6.15 |
| 3,100,728 | 8/1963 | Vello et al. | 148—6.15 |

RICHARD D. NEVIUS, *Primary Examiner.*

M. A. LYONS, WILLIAM D. MARTIN, *Examiners.*